(12) United States Patent
Tsuchida et al.

(10) Patent No.: US 9,177,260 B2
(45) Date of Patent: Nov. 3, 2015

(54) INFORMATION CLASSIFICATION DEVICE, INFORMATION CLASSIFICATION METHOD, AND COMPUTER READABLE RECORDING MEDIUM

(75) Inventors: Masaaki Tsuchida, Tokyo (JP); Hironori Mizuguchi, Tokyo (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 147 days.

(21) Appl. No.: 13/390,034

(22) PCT Filed: Jun. 1, 2010

(86) PCT No.: PCT/JP2010/003655
§ 371 (c)(1),
(2), (4) Date: Feb. 10, 2012

(87) PCT Pub. No.: WO2011/018867
PCT Pub. Date: Feb. 17, 2011

(65) Prior Publication Data
US 2012/0143801 A1    Jun. 7, 2012

(30) Foreign Application Priority Data
Aug. 11, 2009  (JP) ................. 2009-186743

(51) Int. Cl.
*G06F 15/18* (2006.01)
*G06N 99/00* (2010.01)
*G06F 17/30* (2006.01)
(52) U.S. Cl.
CPC ........ *G06N 99/005* (2013.01); *G06F 17/30707* (2013.01)
(58) Field of Classification Search
USPC .................................................. 706/12, 47
See application file for complete search history.

(56) References Cited

U.S. PATENT DOCUMENTS 8,214,437 B1 * 7/2012 Alspector et al. ............. 709/206

FOREIGN PATENT DOCUMENTS

| JP | 2002-007433 A | 1/2002 |
| JP | 2006-190229 A | 7/2006 |
| JP | 2007-293377 A | 11/2007 |

OTHER PUBLICATIONS

Segal, Richard, et al. "SpamGuru: An Enterprise Anti-Spam Filtering System." CEAS. 2004.*

(Continued)

*Primary Examiner* — Kakali Chaki
*Assistant Examiner* — Kevin W Figueroa
(74) *Attorney, Agent, or Firm* — Sughrue Mion, PLLC

(57) ABSTRACT

An information classification device (1) is provided with an union of sets determination unit (10) which performs correct/incorrect determination regarding a content to be classified using a union of sets rule, and an individual determination unit (11) which applies a plurality of individual determination rules to the content to be classified which has been determined as correct, determines whether the content matches the condition, and performs correct/incorrect determination again regarding the content to be classified which has been determined as correct on the basis of the determination result of each individual determination rule. The union of sets determination rule is created using a result of correct/incorrect determination previously performed by two or more people with respect to a plurality of contents which are different from the contents to be classified, and also using feature amounts of respective different contents. Each individual determination rule is created for respective person using the aforementioned result of correct/incorrect determination and the feature amount.

24 Claims, 11 Drawing Sheets

(56) References Cited

OTHER PUBLICATIONS

Islam, Md Rafiqul, Wanlei Zhou, and Morshed U. Chowdhury. "MVGL analyser for multi-classifier based spam filtering system." Computer and Information Science, 2009. ICIS 2009. Eighth IEEE/ACIS International Conference on. IEEE, 2009.*

Mizuguchi, Hironori, et al., "Three-Phase Opinion Analysis System at NTCIR-6", Proceedings of NCTIR-6 Workshop Meeting, Tokyo, Japan, May 15-18, 2007, pp. 330-335.
Fukuda, Takeshi, Ketteigi, Kaikigi, Data Mining, 1st edition, Kyoritsu Shuppan Co., Ltd., Sep. 15, 2007, pp. 93-96.
Mizuguchi, Hironori, et al., "Three-Phase Opinion Analysis System at NTCIR-6", Proceedings of NTCIR-6 Workshop Meeting, Tokyo, Japan, May 15-18, 2007, pp. 330-335.

* cited by examiner

Fig. 3

| ID | Data |
|---|---|
| 1 | subject: Contacting you about the farewell party<br>Hi. Tomorrow we're meeting @7pm...http://... |
| 2 | subject: Secrets that will explode your income<br>...the person next door is already...http://... |
| 3 | subject: Thank you for yesterday.<br>Thanks for everything yesterday. I had a great time. |
| 4 | subject: Winning Pachislo Strategy<br>...http://... |
| 5 | subject: XX Magazine<br>This week's TOP 10...http://... |
| 6 | subject: URGENT!<br>Are you looking for a no-nonsense dating site? ...http |
| ... | ... |

Fig. 4

| Rule ID | Rule Condition | Score |
|---|---|---|
| 1 | Contains URL in body | 0.5 |
| 2 | Contains "strategy" in subject line | 0.5 |
| 3 | Contains "dating" | 1.0 |
| 4 | Contains "secrets" in subject line | 1.0 |
| 5 | Contains "magazine" in subject line | 0.5 |
| ... | ... | ... |

Fig. 5

| Judge ID | Rule condition | Score |
|---|---|---|
| 1 | Contains "magazine" in subject line | 1 |
| 1 | ... | ... |
| 2 | Contains "dating | 1 |
| 2 | ... | ... |
| 3 | Contains "pachislo" | 1 |
| 3 | ... | ... |

Fig. 6

| ID | Classification target data | Judge ID | | | Polling count | Overall |
|---|---|---|---|---|---|---|
| | | 1 | 2 | 3 | | |
| 1 | subject: Contacting you about the farewell party<br>　Hi. Tomorrow we're meeting @7pm...http://... | — | — | — | 0 | Non-spam (according to union of sets determination unit) |
| 2 | subject: Secrets that will explode your income<br>　...the person next door is already...http://... | Agree | Agree | Agree | 3 | Spam |
| 3 | subject: Thank you for yesterday.<br>　Thanks for everything yesterday. I had a great time. | — | — | — | 0 | Non-spam (according to union of sets determination unit) |
| 4 | subject: Winning Pachislo Strategy<br>　...http://... | Agree | Agree | Agree | 2 | Spam |
| 5 | subject: AA Magazine<br>　This week's TOP 10...http://... | Disagree | Disagree | Agree | 1 | Non-spam |
| 6 | subject: URGENT!<br>　Are you looking for a no-nonsense dating site? ...http | Agree | Disagree | Agree | 2 | Spam |
| ... | ... | ... | ... | ... | ... | ... |

Fig. 9

| ID | Feature amount | Judge ID | | |
|---|---|---|---|---|
| | | 1 | 2 | 3 |
| 1 | subject: contacting; subject: farewell party; tomorrow; meeting; 7pm; URL ... | ○ | ○ | ○ |
| 2 | subject: secrets; subject: explode your income; the person; next door; URL ... | × | × | × |
| 3 | subject: thank you; subject: yesterday; thanks for everything; yesterday; great time ... | × | ○ | ○ |
| 4 | subject: winning; subject: pachislo; subject: strategy; URL ... | ○ | × | ○ |
| 5 | subject: magazine; this week; TOP; 10; URL ... | ○ | ○ | × |
| 6 | subject: urgent; no-nonsense; dating; site; URL ... | × | × | × |
| 7 | subject: dating; pachislo; URL ... | × | × | ○ |
| ... | ... | ... | ... | ... |

INFORMATION CLASSIFICATION DEVICE, INFORMATION CLASSIFICATION METHOD, AND COMPUTER READABLE RECORDING MEDIUM

CROSS REFERENCE TO RELATED APPLICATIONS

This application is a National Stage of International Application No. PCT/JP2010/003655 filed Jun. 1, 2010, claiming priority based on Japanese Patent Application No. 2009-186743 filed Aug. 11, 2009 the contents of all of which are incorporated herein by reference in their entirety.

TECHNICAL FIELD

The present invention relates to an information classification device for classifying contents into categories, an information classification method, and a computer readable recording medium.

BACKGROUND ART

Effective use of large amounts of information has been called for in recent years. Classification and management of information is extremely important to effectively use large amounts of information. For example, classifying newspaper articles by topic such as politics and the economy or classifying technical documents by technical field helps narrow down the target for investigation when investigating a specific subject. Therefore, classification of information is useful in using information effectively.

There are not one but many classification methods for classifying any given information, and since each classification method has its advantages and disadvantages, selecting the optimal classification method can prove difficult. Methods for selecting an optimal classification method in the case where a single classification criterion is provided have thus heretofore been proposed (e.g., see Patent Literature 1).

Specifically, with the information classification method disclosed in Patent Literature 1, processing such as the following is executed. First, feature elements are extracted from classification sample data for each classification category. Next, the classification method having the highest classification precision is determined from among a plurality of classification methods, based on the classification sample data. Subsequently, in accordance with the determined classification method, classification learning information representing features for each of the classification categories is generated based on the extracted feature elements. Thereafter, a new text group serving as a classification target is classified for each of the classification categories, in accordance with the determined classification method and the classification learning information.

Incidentally, even if an optimal information classification method is determined, the fact that the classification criterion differs depending on the person in the case where people's sentiment affects the classification criterion makes it difficult to find an intrinsically correct solution to problems regarding classification (classification problems). Suppose, for example, that there are classification problems such as whether an opinion is being given in a certain sentence or whether a feature of a certain product is a factor in that product selling well. Since such classification problems are dependent on people's sentiment, the classification criterion will differ. In order to correct such differences in the classification criterion, a technique has been proposed for executing information classification after determining the classification criterion by a poll involving a plurality of people.

As for conventional polling-type information classification techniques, the following two classification methods are known, for example. Note that in the following description, it is assumed that category classification is performed in advance on a number of pieces of information by each of a plurality of people (n people), and that information obtained by the category classification of each person is assigned as sample data. Also, in the following methods, category classification is executed such that information that is viewed as belonging to a certain category by m ($\leq$n) people or more is classified into that category. Note that, hereinafter, the case where target information is classified into the category of interest will be designated as a "positive example", and the case where target information is not classified into the category of interest will be designated as a "negative example".

With the first classification method, sample data obtained as a result of the category classification performed by n people is acquired first. Next, an information classifier having a specific information classification rule is constructed based on the sample data (e.g., see Non-Patent Literature 1). Note that a specific information classification rule includes, for example, a rule according to which information judged to belong to the category of interest by m people or more is taken as a positive example of the category, and all other information is taken as a negative example of the category.

With the second classification method, sample data obtained by the category classification performed by n people is also acquired first. Next, with the second classification method, the sample data is analyzed per person and n information classifiers corresponding to each person are constructed. Classification into positive examples and negative examples is executed, with information judged by m information classifiers or more to belong to the category of interest being taken as a positive example of the category, and all other information being taken as a negative example of the category. The second classification method differs from the first classification method in that separate information classifiers are constructed with the criterion of each person.

CITATION LIST

Patent Literature

Patent Literature 1: JP 2002-7433A

Non-Patent Literature

Non-Patent Literature 1: Hironori Mizuguchi, Masaaki Tsuchida and Dai Kusui, "Three-Phase Opinion Analysis System at NTCIR-6," Proceedings of NTCIR-6 Workshop Meeting, pp. 330-335, 2007.

DISCLOSURE OF THE INVENTION

Problem to be Solved by the Invention

However, there is a problem with the above-mentioned first classification method and second classification method in that the bias in personal perception of people involved in the creation of sample data, that is, difference in other people's perception is not taken into consideration, making it difficult to improve classification precision.

Here, "bias in personal perception" is explained using FIG. 11. FIG. 11 is an illustrative diagram showing bias in personal perception. As shown in FIG. 11, for example, if the perception of three people A, B and C is depicted with circles, the circles do not coincide and only partially overlap (shaded area in the diagram). In FIG. 11, the portion of each circle that does not overlap is equivalent to "bias in personal perception".

Specifically, with the first classification method, classification is performed on each piece of information, based on the tendency of the n people as a whole. Therefore, the bias in personal perception shown in FIG. 11 is not taken into consideration. Also, with the first classification method, the composition of the m people who judge the target information to be a positive example changes with each piece of information. For example, suppose that a certain piece of information is determined to be a positive example by the judges A and B, another piece of information is determined to be a positive example by the judges A, B, and C, and yet another piece of information is determined to be a positive example by the judges B and C. There is thus no consistency in the classification criterion, which makes it difficult to improve classification precision.

With the second classification method, although bias in personal perception is reflected in the classifiers themselves, no consideration is given to which portion is equivalent to the bias in personal perception in each classifier. In other words, even with the second classification method, the fact that the bias portion and common portion in personal perception are not specified makes it difficult to improve classification precision, since information classification is not performed with these portions taken into consideration.

Further, with the second classification method, bias in personal perception is reflected too strongly in each classifier, leading also to the case where information that should be determined to be a positive example is not classified as a positive example or information that should be a negative example is not classified as a negative example. Improving classification precision is also difficult in this case.

An object of the present invention is to solve the above problems by providing an information classification device, an information classification method and a computer readable recording medium that enable improvement in classification precision by recognizing bias in personal perception and reflecting this recognition in information classification.

Means for Solving the Problem

In order to attain the above object, an information classification device in the present invention is an information classification device for classifying contents targeted for classification into a category that includes a first determination unit that performs correct/incorrect determination on the contents targeted for classification, using a first rule, and a second determination unit that applies each of a plurality of second rules having mutually different conditions to a content determined to be correct by the first determination unit and determines whether the condition is met, and performs correct/incorrect determination for a second time on the content determined to be correct by the first determination unit, based on a determination result of each of the plurality of second rules, the first rule being created using a result of correct/incorrect determination executed in advance on each of a plurality of contents that are different from the contents targeted for classification by two or more people and a feature amount of each of the plurality of different contents, and each of the plurality of second rules being created to correspond to a different one of the two or more people, using the result of correct/incorrect determination executed in advance by the two or more people and the feature amount.

Also, in order to attain the above object, an information classification method in the present invention is an information classification method for classifying contents targeted for classification into a category that includes the steps of (a) performing correct/incorrect determination on the contents targeted for classification, using a first rule, and (b) applying each of a plurality of second rules having mutually different conditions to a content determined to be correct in the step (a) and determining whether the condition is met, and performing correct/incorrect determination for a second time on the content determined to be correct in the step (a), based on a determination result of each of the plurality of second rules, the first rule being created using a result of correct/incorrect determination executed in advance on each of a plurality of contents that are different from the contents targeted for classification by two or more people and a feature amount of each of the plurality of different contents, and each of the plurality of second rules being created to correspond to a different one of the two or more people, using the result of correct/incorrect determination executed in advance by the two or more people and the feature amount.

Further, in order to attain the above object, a computer readable recording medium in the present invention is a computer readable recording medium having recorded thereon a program for causing a computer to execute classification of contents targeted for classification into a category, the program including a command for causing the computer to execute the steps of (a) performing correct/incorrect determination on the contents targeted for classification, using a first rule, and (b) applying each of a plurality of second rules having mutually different conditions to a content determined to be correct in the step (a) and determining whether the condition is met, and performing correct/incorrect determination for a second time on the content determined to be correct in the step (a), based on a determination result of each of the plurality of second rules, the first rule being created using a result of correct/incorrect determination executed in advance on each of a plurality of contents that are different from the contents targeted for classification by two or more people and a feature amount of each of the plurality of different contents, and each of the plurality of second rules being created to correspond to a different one of the two or more people, using the result of correct/incorrect determination executed in advance by the two or more people and the feature amount.

Effects of the Invention

As described above, an information classification device, an information classification method and a program in the present invention enable classification precision to be improved by recognizing bias in personal perception and reflecting this recognition in information classification.

BRIEF DESCRIPTION OF DRAWINGS

FIG. 3 is a diagram showing an example of classification target data used in Embodiment 1.

FIG. 4 is a diagram showing an example of union of sets determination rules used in Embodiment 1.

FIG. 5 is a diagram showing an example of individual determination rules used in Embodiment 1.

FIG. 6 is a diagram showing an example of classification results in Embodiment 1.

FIG. 9 is a diagram showing an example of training data used in Embodiment 2.

BEST MODE FOR CARRYING OUT THE INVENTION

Embodiment 1

Figure 1:
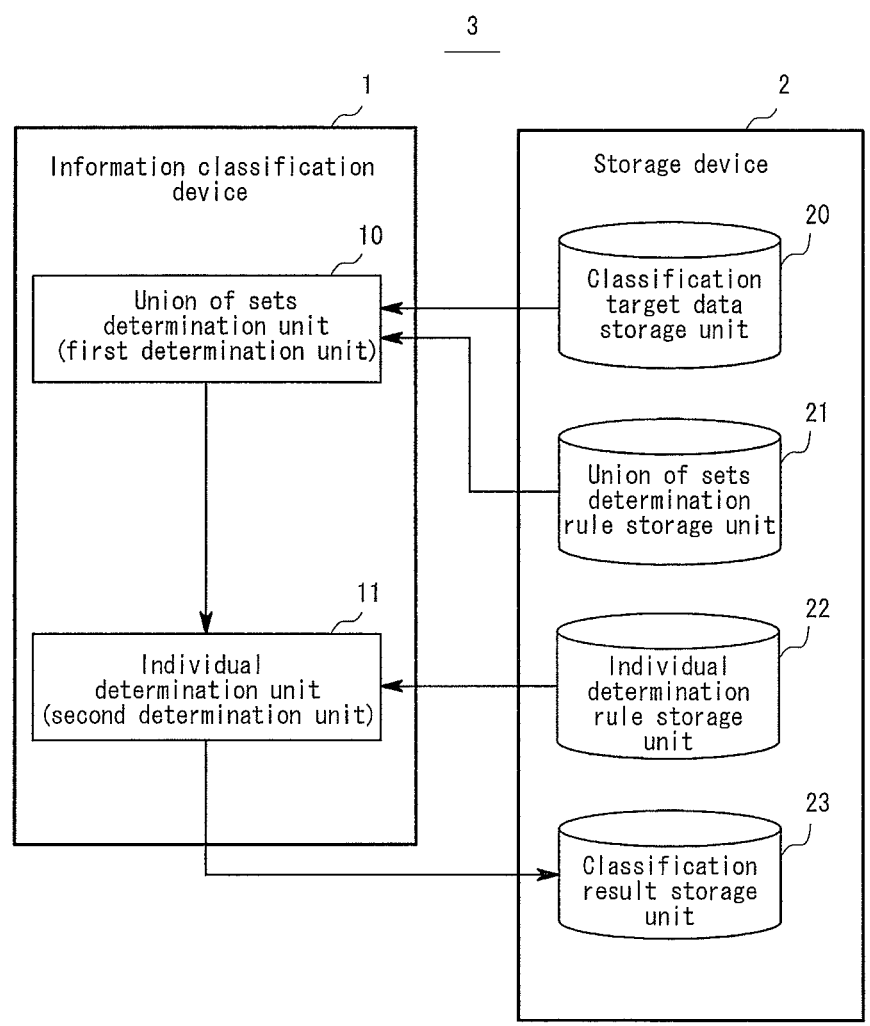
FIG. 1 is a block diagram showing the configuration of an information classification device in Embodiment 1.

Hereafter, an information classification device and an information classification method in Embodiment 1 of the present invention are described, with reference to FIGS. 1 to 6. Initially, the configuration of the information classification device in Embodiment 1 is described using FIG. 1. FIG. 1 is a block diagram showing the configuration of the information classification device in Embodiment 1.

An information classification device 1 of Embodiment 1 shown in FIG. 1 is a device for classifying contents targeted for classification (classification target contents) into categories. In Embodiment 1, contents include e-mails, Web pages, and the like.

In the following description, an example is given in which two-class classification as to whether classification target contents belong to a certain category is executed. Embodiment 1 is, however, not limited thereto. Embodiment 1 is also applicable to the case where the information classification device 1 classifies classification target contents into any of a plurality of categories (classes). In this case, the information classification device 1 determines, for each category, whether classification target contents belong to that category.

As shown in FIG. 1, the information classification device 1 is provided with a first determination unit 10 and a second determination unit 11. The first determination unit 10 executes correct/incorrect determination on contents targeted for classification, using a first rule.

The second determination unit 11 applies each of a plurality of second rules having mutually different conditions to contents determined to be correct by the first determination unit 10, and determines whether the condition is met. Also, the second determination unit 11 performs correct/incorrect determination for a second time on contents determined to be correct by the first determination unit 10, based on the determination result of each of the plurality of second rules.

The first rule is created from a plurality of contents (contents for rule creation) that are different from the contents targeted for classification. Specifically, the first rule is created using a result of correct/incorrect determination executed in advance on each rule creation content by two or more people and a feature amount of each rule creation content.

Further, each second rule is created to correspond to a different one of the people who performed correct/incorrect determination on the above-mentioned rule creation contents. Each second rule is created using the correct/incorrect determination result and the feature amount that were mentioned in creating the first rule.

Accordingly, the volition of all the people who contributed to creation of the first rule and the second rules is reflected in the result of the initial correct/incorrect determination using the first rule. On the other hand, the bias in personal perception is strongly reflected in the result of determination performed using each second rule.

Thus, the information classification device 1 first performs determination from which the bias in personal perception has been excluded on the classification target contents. The information classification device 1 then applies the second rules in which the bias in personal perception is reflected to only classification target contents that are determined to be correct, and specifies the difference in perception for each person. Thereafter, the information classification device 1 performs determination for a second time on the classification target contents, based on the result of applying the second rules. Thus, according to the information classification device 1, the bias in personal perception is recognized, and this recognition is reflected in information classification, resulting in an improvement in classification precision being achieved.

Here, the configuration of the information classification device 1 in Embodiment 1 is described more specifically. As shown in FIG. 1, in Embodiment 1, a storage device 2 is connected to the information classification device 1. The information classification device 1 together with the storage device 2 constitutes an information classification system 3.

Also, in Embodiment 1, the first rule and the second rules are created in advance by machine learning using a computer or the like. In this case, the first rule preferably is created using the result of correct/incorrect determination performed in advance on each rule creation content by two or more people and the feature amount of each rule creation content, by learning the correct/incorrect determination of the two or more people. Further, each second rule preferably is created using the result of correct/incorrect determination and the feature amount that were mentioned in creating the first rule, by learning the correct/incorrect determination of each person.

Specifically, the first rule preferably is learned by setting contents determined to be correct by a predetermined m number of people as correct data and setting the other contents as incorrect data, among the plurality of rule creation contents. In this case, m preferably is 1. Therefore, the first rule preferably is learned by setting contents determined to be correct by at least one person as correct data and setting the other contents as incorrect data.

For example, suppose that correct/incorrect determination is performed on rule creation contents by three people A, B and C. In this case, learning is performed such that the contents contained in the union of A, B and C (A∪B∪C) shown by the thick lines in FIG. 11 are set as correct (correct answer), and the contents that are not contained in this union are set as incorrect (incorrect answer).

Further, each second rule preferably is learned by setting contents that j people or less including the person corresponding to the second rule agree on as correct data and setting contents that k people or more including the person corresponding to the second rule agree on as incorrect data, among the plurality of rule creation contents. In this case, both j and k are integers of 1 or more, and preferably are in the relation k>j. The values of j and k can be set appropriately.

Figure 11:
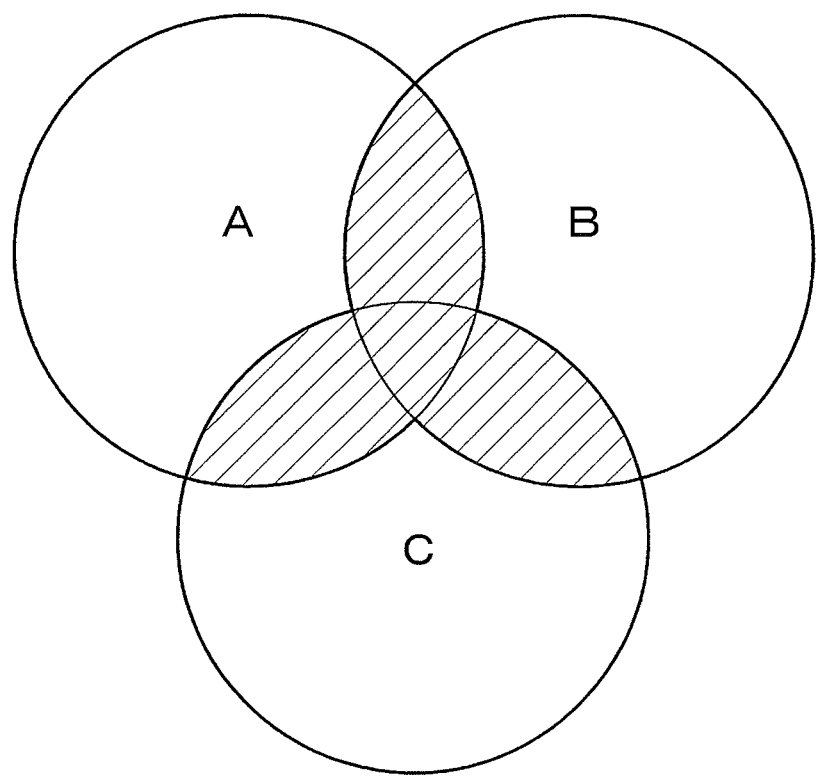
FIG. 11 is an illustrative diagram showing bias in personal perception.

For example, in the case of creating the second rule corresponding to A in FIG. 11 with j and k respectively set to 1 and 3, learning is performed such that contents that only A agrees on are set as correct, and contents that all of the people A, B and C agree on are set as incorrect. Personal bias reflected in the second rule will tend to be stronger, the smaller the value of j and the larger the value of k. Conversely, personal bias reflected in the second rule will tend to be weaker, the larger the value of j and the smaller the value of k.

In the subsequent description, the first rule is referred to as the "union of sets determination rule" and the first determination unit 10 is referred to as the "union of sets determination unit" 10. Further, the second rules are referred to as "individual determination rules", and the second determination unit 11 is referred to as the "individual determination unit" 11. Specific examples of the union of sets determination rule and the individual determination rules are discussed later (see FIGS. 4 and 5).

Note that in the present embodiment, the union of sets determination rule (first rule) and the individual determination rules (second rules) may be manually created in advance. In this case, the union of sets determination rule preferably is created to be a rule according to which contents that at least one person determines to be correct are taken as correct data and the other contents are taken as incorrect data, among the plurality of different contents. Each individual determination rule preferably is created to be a rule according to which contents that j people or less including the corresponding person agree on are taken as correct data and contents that k (k>j) people or more including the corresponding person agree on are taken as incorrect data, among the plurality of different contents.

Also, as shown in FIG. 1, in Embodiment 1, the storage device 2 is provided with a classification target data storage unit 20, a union of sets determination rule storage unit 21, an individual determination rule storage unit 22, and a classification result storage unit 23. These are actually constructed in the storage area of the storage device 2.

Data that is targeted for determination by the union of sets determination rule and the individual determination rules, that is, the data of classification target contents (classification target data) is stored in the classification target data storage unit 20. Also, the form (format) of the classification target data is not limited as long as the data will serve as a determination target, and may be in any format such as text format, binary format or the like. In other words, classification target data that is not limited in format is stored in the classification target data storage unit 20.

Also, a union of sets determination rule that is used by the union of sets determination unit 10 is stored in the union of sets determination rule storage unit 21. A plurality of individual determination rules that are used by the individual determination unit 11 are stored in the individual determination rule storage unit 22. The result of the information classification ultimately performed by the individual determination unit 11 that is discussed later is stored in the classification result storage unit 23.

The union of sets determination unit 10, in Embodiment 1, extracts classification target data from the classification target data storage unit 20, and executes correct/incorrect determination on the extracted data, using a union of sets determination rule retrieved from the union of sets determination rule storage unit 21. Specifically, the union of sets determination unit 10 determines, for instance, whether the classification target contents is spam (correct) or non-spam (incorrect), using a union of sets determination rule that includes a criterion for judging whether a content is spam.

Also, the individual determination unit 11, in Embodiment 1, receives the determination result from the union of sets determination unit 10, and, further, retrieves the individual determination rules from the individual determination rule storage unit 22, and applies each individual determination rule to contents determined to be correct by the union of sets determination unit 10. The individual determination unit 11 then aggregates the results of each individual determination rule.

For example, suppose that the individual determination rules have conditions for determining a content to be spam, and that those conditions differ for each individual determination rule. Suppose that such individual determination rules are then applied to contents determined to be spam (correct) by the union of sets determination unit 10. The individual determination unit 11 aggregates the results for one or both of the case where the individual determination rule agrees with the determination result of the union of sets determination unit 10 (case where the content is determined to be spam) and the case where the individual determination rule does not agree with the determination result of the union of sets determination unit 10 (case where the content is determined to be non-spam). Note that aggregation is performed by, for example, counting the number of individual determination rules corresponding to each case.

In Embodiment 1, the individual determination unit 11 then performs correct/incorrect determination for a second time, based on the number of individual determination rules that meet the condition (that agree with the determination result of the union of sets determination unit 10) or the number of individual determination rules that do not meet the condition (that do not agree with the determination result of the union of sets determination unit 10). For example, in the case where there are more individual determination rules that determine the content to be spam than individual determination rules that determine the content to be non-spam, the individual determination unit 11 determines the classification target content to be spam (correct). The individual determination unit 11 then classifies this classification target content as spam, and stores the classification result in the classification result storage unit 23.

Figure 2:
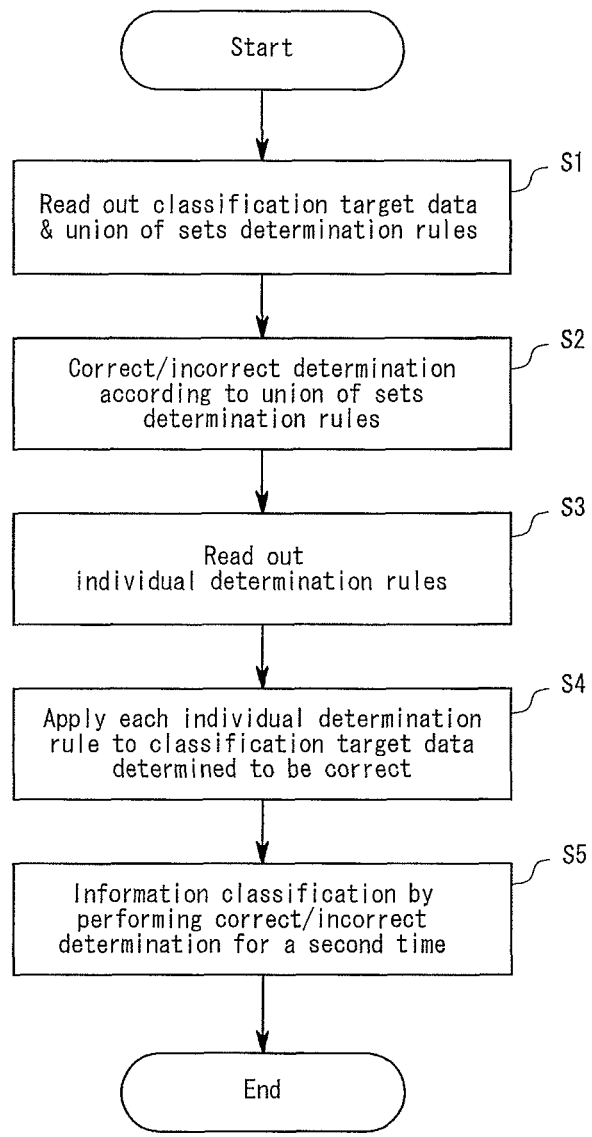
FIG. 2 is a flowchart showing operation of the information classification device in Embodiment 1.

Next, operation of the information classification device 1 in Embodiment 1 shown in FIG. 1 is described using FIGS. 2 to 6. FIG. 2 is a flowchart showing operation of the information classification device in Embodiment 1.

In Embodiment 1, an information classification method can be implemented by operating the information classification device 1. Therefore, description of the information classification method in Embodiment 1 is replaced with description of operation of the information classification device 1. In the following description, FIG. 1 is referred to as appropriate.

Further, in the following description, the case where the classification target contents are e-mails and these e-mails are classified as either spam or non-spam is described as an example. Also, as already mentioned, since the definition of spam and non-spam usually differs depending on the person, classification preferably is decided by a poll involving a plurality of judges. In the following description, it is assumed that the number of judges is set to three, and e-mails determined to be spam according to two or more of the individual determination rules corresponding to the judges are ultimately classified as spam. Note that union of sets determination rules and individual determination rules are created in advance from the result of the determination already performed on other e-mails by a plurality of judges (people).

As shown in FIG. 2, first, the union of sets determination unit 10 reads out one or more pieces of classification target data from the classification target data storage unit 20, and reads out union of sets determination rules from the union of sets determination rule storage unit 21 (step S1).

The data shown in FIG. 3 is given as a specific example of classification target data read out at step S1. Also, the rules shown in FIG. 4 are given as a specific example of union of sets determination rules read out at step S1. FIG. 3 is a diagram showing an example of classification target data used in Embodiment 1. FIG. 4 is a diagram showing an example of union of sets determination rules used in Embodiment 1.

As shown in FIG. 3, in Embodiment 1, each piece of classification target data is constituted by an identifier "ID" for specifying the data, and "data" specifying the data body (contents of the e-mail). Also, as shown in FIG. 4, in Embodiment 1, the union of sets determination rules are constituted by an identifier "rule ID" for specifying the rules, a "rule condition" specifying the conditions of the rules, and a "score" specifying the score assigned in the case where the rule conditions are matched. Further, the union of sets determination rules shown in FIG. 4 are rules for determining whether a classification target e-mail is spam or non-spam.

Next, the union of sets determination unit 10 applies the union of sets determination rules to each piece of classification target data read out at step S1, executes correct/incorrect determination, and passes the result of correct/incorrect determination to the individual determination unit 11 (step S2).

Specifically, at step S2 in Embodiment 1, the union of sets determination unit 10 applies each union of sets determination rule to the "data" of the classification target data, and computes a total "score" of rules whose condition is matched. The union of sets determination unit 10 then, for example, determines data whose total value exceeds 1 to be spam (correct) and data with a lower total value to be non-spam (incorrect).

For example, since the classification target data whose "ID" is 1 contains a URL in the body, 0.5 is assigned as the "score" since the condition matches when the union of sets determination rule whose "rule ID" is 1 is applied. However, since the total "score" is less than 1, the classification target data whose "ID" is 1 is determined to be non-spam (incorrect). On the other hand, the classification target data whose "ID" is 2 contains a URL and the word "secrets" in the body. Since the classification target data whose "ID" is 2 matches the conditions whose "rule ID" is 1 and 4, the total score assigned will be 1.5. Therefore, the classification target data whose "ID" is 2 is determined to be spam (correct). Note that the total value serving as the judgment criterion is appropriately set according to the contents of each classification target content, the required classification precision, and the like.

Next, the individual determination unit 11, on receipt of the determination result from the union of sets determination unit 10, reads out individual determination rules from the individual determination rule storage unit 22 (step S3). The rules shown in FIG. 5 are given as a specific example of individual determination rules read out at step S3. FIG. 5 is a diagram showing an example of individual determination rules used in Embodiment 1.

As shown in FIG. 5, in Embodiment 1, the individual determination rules are constituted by a "judge ID" specifying corresponding judges, a "rule condition" specifying the conditions of the rules, and a "score" specifying the score assigned in the case where the rule conditions are matched. Further, the individual determination rules shown in FIG. 5 are also rules for determining whether an e-mail targeted for classification is spam or non-spam, similarly to the union of sets determination rules.

The individual determination rules shown in FIG. 5 are each created by learning according to which, for example, contents that only the corresponding judge determines to be "spam" are set as correct, and contents that the three people including the corresponding judge commonly determine to be "spam" are set as incorrect. Therefore, the initial individual determination rule whose "judge ID" is 1 represents the fact that the judge whose "judge ID" is 1 has a tendency to particularly view e-mails containing the word "magazine" in the subject line as spam. Since not all e-mails containing the word "magazine" in the subject line will necessarily be viewed as spam, this individual determination rule is equivalent to bias in the perception of the judge whose "judge ID" is 1.

Next, the individual determination unit 11 specifies classification target data that was determined to be correct, from the determination result of the union of sets determination unit 10 at step S2, and applies each individual determination rule to the specified classification target data (step S4). Specifically, the individual determination unit 11, first, sets the polling count (see FIG. 6) for classification target data that was not determined to be correct to "0". On the other hand, the individual determination unit 11 applies each individual determination rule to the classification target data that was determined to be correct, and counts the number of cases where the application result agrees with the determination result of step S2 (cases where data is determined to be spam). The individual determination unit 11 then sets the value obtained by the count as the polling count for the classification target data that was determined to be correct.

Next, the individual determination unit 11 executes correct/incorrect determination for a second time on each piece of classification target data, based on the result of step S4, and performs information classification using the result thereof (step S5). In Embodiment 1, the correct/incorrect determination of step S5 results in data being taken as correct if the number of cases where the application result agrees with the determination result of step S2 ("polling count" shown in FIG. 6) is greater than or equal to a threshold, and data being taken as incorrect if less than the threshold. The content of classification target data that is taken as correct is classified as spam, and the content of classification target data that is taken as incorrect is classified as non-spam. The processing in the information processing device 1 ends with execution of step S5.

Here, steps S4 and S5 are specifically described using FIG. 5 and FIG. 6. FIG. 6 is a diagram showing an example of classification results in Embodiment 1. In the example of FIG. 6, the "classification target data IDs" 1 and 3 among the classification target data are judged to be incorrect (non-spam) in step S2. Therefore, at step S4, the "classification target data IDs" 2, 4, 5, 6 and so on will be targeted for application. In the case where the individual determination rules shown in FIG. 5 are used, the individual determination unit 11, in step S4, contrasts the classification target data and the rule conditions of each individual determination rule, and adds up the scores of matched rule conditions. In the case where the added-up value of the scores exceeds a threshold, the individual determination unit 11 is able to determine that the result of applying the individual determination rule agrees with the determination result of step S2.

For example, suppose that, in the case where the threshold is set to "1", the individual determination rule whose "judge ID" is 1 is applied to the classification target data whose "classification target data ID" is 5. Since the classification target data whose "classification target data ID" is 5 contains the word "magazine" in the subject line (see FIG. 3), the score of the individual determination rule whose "judge ID" is 1 will be 1 (see FIG. 5). Therefore, since the score does not exceed 1, the result of applying the individual determination rule whose "judge ID" is 1 to the classification target data whose "classification target data ID" is 5 will be non-spam, or "disagree" (see FIG. 6 discussed later). Similarly, in the case where the individual determination rule whose "judge ID" is 2 is applied to the classification target data whose "classification target data ID" is 5, the application result will also be "disagree".

With the classification target data whose "classification target data ID" is 5, because the application results of two individual determination rules are "disagree", the value of the "polling count" will be "1" obtained by subtracting the number of disagree results "2" from the total number of individual determination rules "3". In step S5, supposing that the threshold of the polling count is set to "2", the classification target data whose "classification target data ID" is 5 will in this case be determined to be non-spam. On the other hand, with the classification target data whose "classification target data ID" is 2, since the application results of the individual determination rules are all "agree", the e-mail is determined to be spam. Similarly, with the classification target data whose "classification target data ID" is 4, although the application result of the individual determination rule whose "judge ID" is 3 is "disagree", the e-mail is determined to be spam since the polling count is "2".

Note that, in the example of FIG. 6, classification target data that is determined to be "incorrect" by the union of sets determination unit 10 in step S2 is directly taken as "non-spam". Also, the "classification target data IDs" 2, 4 and 6 whose "polling count" are 2 or more are determined to be "spam", among the classification target data determined to be "correct" by the union of sets determination unit 10 in step S2. On the other hand, the "classification target data ID" 5 that does not satisfy the threshold is determined to be "non-spam".

As described above, in Embodiment 1, union of sets determination that is equivalent to determination by all the judges and individual determination that is equivalent to determination by each judge are performed based on the data obtained from a plurality of judges. The union of sets determination involves determining only whether contents are correct or incorrect, and the individual determination involves executing majority determination on contents that are judged to be correct, using the result of individual determination, and finally classifying the contents. Embodiment 1 thus enables an improvement in the classification precision of information classification to be achieved, because personal perception can be reflected in information classification, while at the same time suppressing the tendency for the bias in personal perception to be overemphasized.

Embodiment 2

Figure 7:
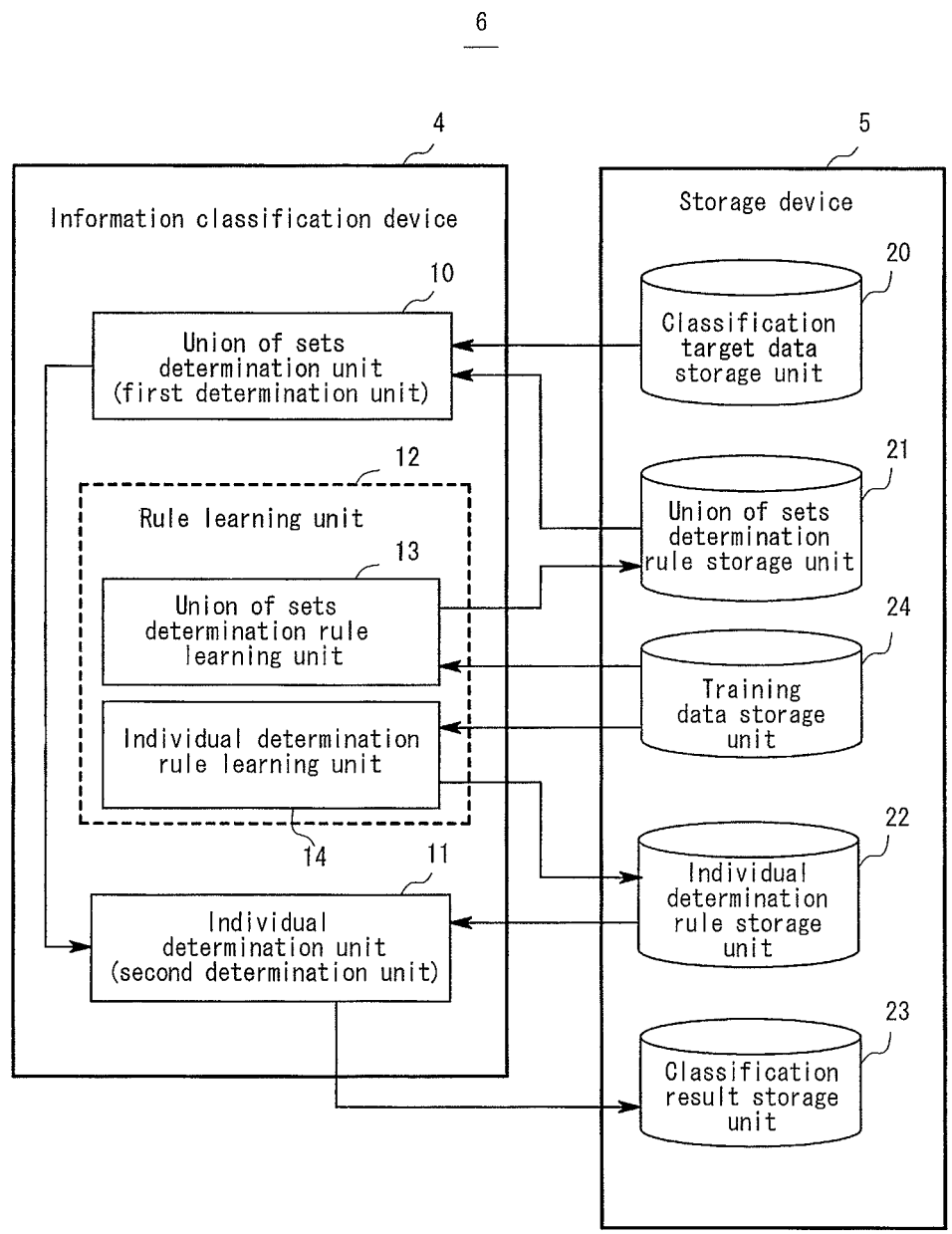
FIG. 7 is a block diagram showing the configuration of an information classification device in Embodiment 2.
Figure 8:
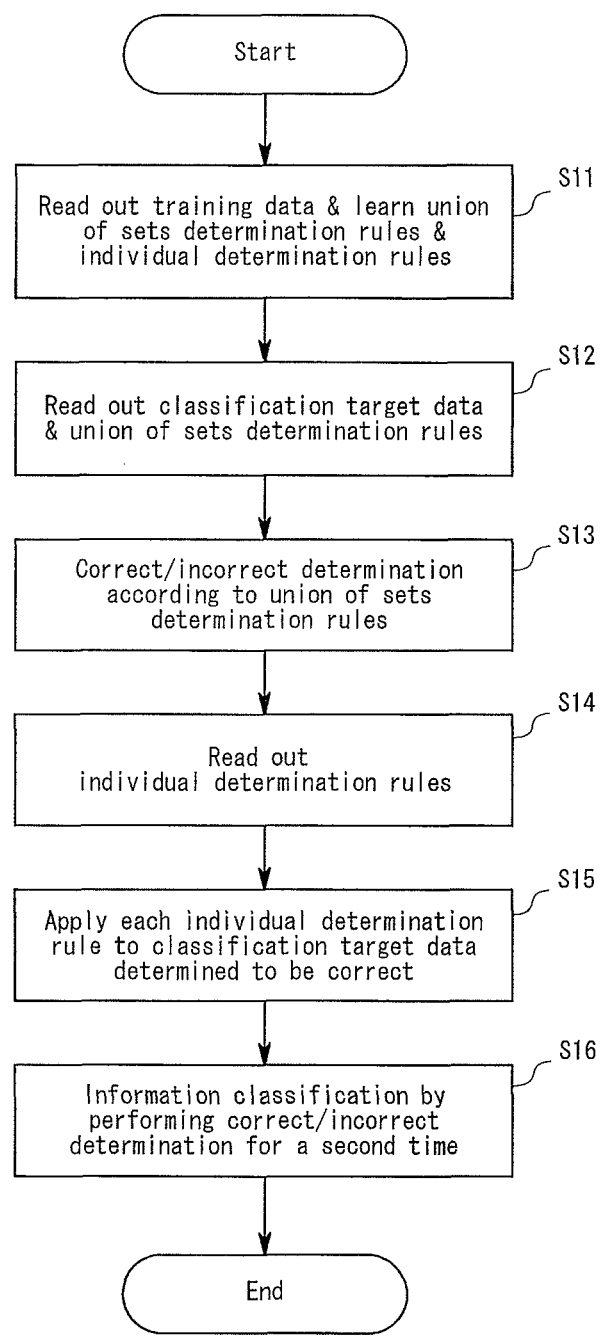
FIG. 8 is a flowchart showing operation of the information classification device in Embodiment 2.

Next, an information classification device and an information classification method in Embodiment 2 of the present invention are described, with reference to FIGS. 7 to 9. Initially, the configuration of the information classification device in Embodiment 2 is described using FIG. 7. FIG. 7 is a block diagram showing the configuration of the information classification device in Embodiment 2. Note that, similarly to Embodiment 1, an example in which two-class classification as to whether classification target contents belong to a certain category is executed is also given in Embodiment 2.

An information classification device 4 of Embodiment 2 shown in FIG. 7 is provided with a function of automatically acquiring union of sets determination rules and individual determination rules by machine learning, this point being different from the information classification device 1 of Embodiment 1 shown in FIG. 1.

As shown in FIG. 7, the information classification device 4, unlike the information classification device 1, is provided with a rule learning unit 12, in addition to the union of sets determination unit 10 and the individual determination unit 11. Also, a storage device 5, unlike the storage device 2 shown in FIG. 1, is further provided with a training data storage unit 24.

Apart from these points, the information classification device 4 and the storage device 5 are constituted similarly to the information classification device 1 and the storage device 2 shown in FIG. 1 in Embodiment 1. Hereinafter, the differences are specifically described. Note that the information classification device 4 together with the storage device 5 also constitutes an information classification system 6 in Embodiment 2.

In Embodiment 2, the training data storage unit 24 constructed in the storage device 5 stores training data that is used for learning union of sets determination rules and individual determination rules. Training data is data that is created from a plurality of contents (contents for rule creation) that are different from the contents targeted for classification. Training data includes the result of correct/incorrect determination executed in advance on each rule creation content by two or more people and the feature amount of each rule creation content.

Also, in Embodiment 2, although the training data storage unit 24 is constructed in the storage area of a storage device common to the classification target data storage unit 20 and the like, it is not limited to this example. The training data storage unit 24 may be constructed in the storage area of a different storage device from the storage device in which the classification target data storage unit 20 and the like are constructed.

The rule learning unit 12 creates union of sets determination rules and individual determination rules by learning based on the training data stored in the training data storage unit 24. The rule learning unit 12 is provided with a union of sets determination rule learning unit 13 that learns union of sets determination rules, and an individual determination rule learning unit 14 that learns individual determination rules.

Respective examples of the union of sets determination rules and the individual determination rules learned in Embodiment 2 include the union of sets determination rules and the individual determination rules shown in Embodiment 1. For example, the union of sets determination rule learning unit 13 performs learning by setting contents that at least one person determines to be correct as correct data and setting the other contents as incorrect data, among the plurality of rule creation contents, and creates union of sets determination rules.

Also, the individual determination rule learning unit 14 performs learning by setting contents that j people or less including one of the judges agree on as correct data and setting contents that k people or more including that one judge agree on as incorrect data, among the plurality of rule creation contents, and creates individual determination rules. Similarly to Embodiment 1, both j and k are integers of 1 or more, and are in a relation "k>j". The values of j and k can be set appropriately.

Further, in Embodiment 2, the specific method of learning by the union of sets determination rule learning unit 13 and the individual determination rule learning unit 14 is not particularly limited. Specific learning methods include learning methods that use (supervised) learning algorithms to which arbitrary supervision patterns are assigned, such as SVMs (support vector machines), decision trees or the like, for example.

For example, in the case where an SVM is used, each learning unit learns using a correct answer data group together with respective feature amounts and an incorrect answer data group together with respective feature amounts, and outputs a feature amount that is effective in classification as a learning result. The output feature amount will be a union of sets determination rule or an individual determination rule. Note that the rule output as the result of learning by an SVM is usually created in a format readable by a machine such as a computer, rather than being in human-readable format. Conceptually, however, these rules are similar to the rules shown in FIGS. 4 and 5.

The union of sets determination rule learning unit 13 stores created union of sets determination rules in the union of sets determination rule storage unit 21. The individual determination rule learning unit 14 stores created individual determination rules in the individual determination rule storage unit 22.

Next, operation of the information classification device 4 in Embodiment 2 shown in FIG. 7 is described using FIGS. 8 and 9. FIG. 8 is a flowchart showing operation of the information classification device in Embodiment 2. FIG. 9 is a diagram showing an example of the training data used in Embodiment 2.

In Embodiment 2, the information classification method can also be implemented by operating the information classification device 4, similarly to Embodiment 1. Therefore, description of the information classification method in Embodiment 2 is replaced with description of operation of the information classification device 4. Also, in the following description, FIG. 7 is referred to as appropriate.

Note that Embodiment 2 is also described giving the case where the classification target contents are e-mails and these e-mails are classified as either spam or non-spam as an example. Also, training data includes the result of the determination already performed by three judges on different e-mails from the classification targets. In Embodiment 2, e-mails determined to be spam according to two or more of the individual determination rules corresponding to the judges are ultimately classified as spam.

As shown in FIG. 8, initially, the rule learning unit 12 reads out training data from the training data storage unit 24, and learning of union of sets determination rules by the union of sets determination rule learning unit 13 and learning of individual determination rules by the individual determination rule learning unit 14 are then executed (step S11). After execution of step S11, the union of sets determination rules are stored in the union of sets determination rule storage unit 21, the individual determination rules are stored in the individual determination rule storage unit 22.

Here, learning of rules by the union of sets determination rule learning unit 13 and the individual determination rule learning unit 14 is described using FIG. 9. Training data is managed using "IDs" specifying pieces of constituent data constituting the training data, as shown in FIG. 9. Each piece of constituent data is the data of a content for rule training. Training data includes, for each piece of constituent data specified by an ID, the feature amount used in rule learning and the result of correct/incorrect determination by the judges.

In the result of correct/incorrect determination shown in FIG. 9, "○" indicates cases where the judge determined that the rule creation content is correct (spam: correct answer), and "x" indicates cases where the judge determined that the rule creation content is incorrect (non-spam: incorrect answer).

Also, in FIG. 9, the "feature amount" represents the characteristics of rule creation contents (constituent data) targeted for learning. In the example shown in FIG. 9, the surface strings of independent words (nouns, verbs, adjectives, adjectival verbs, etc.) that are included in the subject line of constituent data or in the body of contents are used as feature amounts.

For example, "subject: contacting" and "subject: farewell party" that are contained in the feature amount of the constituent data whose "ID" is 1 represent the fact that words such as farewell party and contacting are contained in the subject line. Also, "tomorrow", "meeting" and "7 pm" included in the feature amount of the constituent data whose "ID" is 1 represent words that are contained in the body of the content.

Note that the feature amounts shown in FIG. 9 are merely an example, and the feature amounts are not limited to the example in FIG. 9. For example, the feature amounts may include surface strings other than those of independent words, or may include surface strings of parts of speech other than nouns. Also, the feature amounts may include combinations of parts of speech and words with dependency relations, combinations of parts of speech of words with dependency relations, respective frequencies thereof, or the like.

Also, the union of sets determination rule learning unit 13 is able to learn rules that are likely to be determined to be a correct answer by, for example, setting constituent data that any of the judges determines to be correct as a correct answer and the other data as an incorrect answer. In this case, union of sets determination rules, in the example of FIG. 9, are learned by setting the constituent data whose ID is 1, 3, 4, 5, 7 and so on as a correct answer, and setting the constituent data whose ID is 2, 6 and so on as an incorrect answer.

Further, the individual determination rule learning unit 14 is able to learn rules that are likely to be determined to be a correct answer by, for example, setting constituent data that from one person to j people or less including a certain judge determine to be correct as a correct answer, and setting constituent data that k people or more including that judge determine to be correct as an incorrect answer. For example, suppose that j=2 and k=3. In this case, the individual determination rule corresponding to the judge whose judge ID is 1 is learned by setting constituent data whose ID is 1 and so on as an incorrect answer, and setting constituent data whose ID is 4, 5, and so on as a correct answer.

Note that algorithms for learning by the union of sets determination rule learning unit 13 and the individual determination rule learning unit 14 in step S11 include supervised learning algorithms such as the above-mentioned SVMs, decision trees, and the like.

After execution of step S11, the union of sets determination unit 10 reads out the one or more pieces of classification target data from the classification target data storage unit 20, and reads out union of sets determination rules from the union of sets determination rule storage unit 21 (step S12). Further, the union of sets determination unit 10 applies the union of sets determination rules to each classification target data read out at step S12, executes correct/incorrect determination, and passes the result of correct/incorrect determination to the individual determination unit 11 (step S13).

Next, the individual determination unit 11, on receipt of the determination result from the union of sets determination unit 10, reads out individual determination rules from the individual determination rule storage unit 22 (step S14), and applies each individual determination rule to classification target data determined to be correct at step S13 (step S15). Subsequently, the individual determination unit 11 executes correct/incorrect determination for a second time on each piece of classification target data, based on the results of step S15, and classifies information using the result thereof (step S16). The processing in the information processing device 4 ends with execution of step S16. Note that steps S12 to S16 are respectively similar steps to step S1 to S5 shown in FIG. 2 in Embodiment 1. Steps S12 to S16 are performed in conformity with steps S1 to S5 shown in FIG. 2.

Thus, in Embodiment 2, information classification is executed after union of sets determination rules and individual determination rules have been automatically acquired from training data. Embodiment 2 thus enables the cost for rule creation to be reduced in comparison to the case where union of sets determination rules and individual determination rules are created in advance, particularly, in the case where these rules are created manually. Also, the effects mentioned in Embodiment 1 can be acquired in Embodiment 2.

Figure 10:
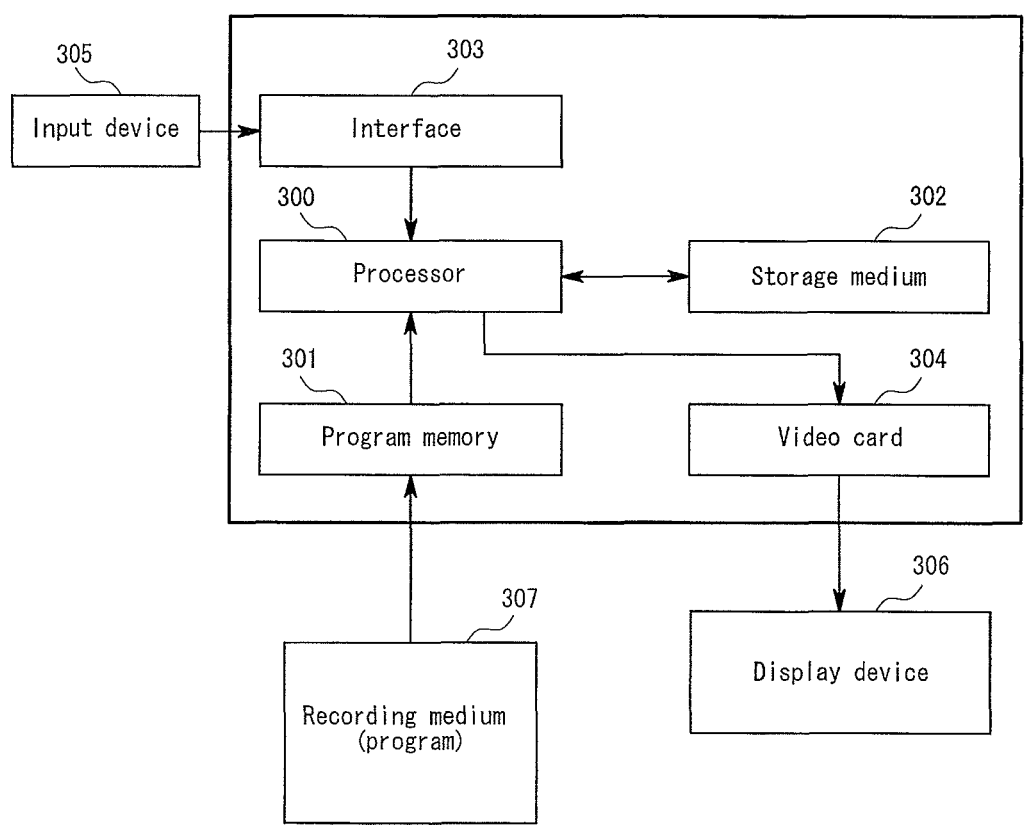
FIG. 10 is a block diagram showing a computer capable of executing a program in Embodiment 1 or 2 of the present invention.

Although an information classification device and an information classification method were described in Embodiments 1 and 2 of the present invention, the present invention is, further, also realizable as computer software. Here, a program in Embodiments 1 and 2 is described. FIG. 10 is a block diagram showing a computer capable of executing a program in Embodiment 1 or 2 of the present invention.

The computer shown in FIG. 10 functions as an information processing device that implements the information classification device according to the present invention. As shown in FIG. 10, the computer (information processing device) is provided with a processor 300, a program memory 301, a storage medium 302, an interface 303 for connecting an external device, and a video card 304 for outputting display data. As for the storage medium 302, various types of memory such as RAM or magnetic storage media such as a hard disk can be used. Note that an input device 305 such as a keyboard and a display device 306 such as a liquid crystal display device are connected to the computer.

A program that executes the processing steps performed by the information classification device of Embodiment 1 or 2 is stored in the program memory 301, and the processor 300 operates as a result of this program.

For example, if a program that embodies steps S1 to S5 shown in FIG. 2 is stored in the program memory 301 and this program is executed, the information processing device 1 of Embodiment 1 is realized. In this case, the processor 300 functions as the union of sets determination unit 10 and the individual determination unit 11. The storage medium 302 functions as the storage device 2.

Similarly, if a program that embodies step S11 to S16 shown in FIG. 8 is stored in the program memory 301 and this program is executed, the information classification device 4 of Embodiment 2 is realized. In this case, the processor 300 functions as the union of sets determination unit 10, the individual determination unit 11, the union rule learning unit 13, and the individual determination rule learning unit 14. The storage medium 302 functions as the storage device 5 in this case.

Also, the program is provided in a state of being stored in a computer readable recording medium 307. Note that the program may circulate on the Internet connected via a communication interface 117. Specific examples of the recording medium 307 include a generic semiconductor storage device such as CF (Compact Flash) or SD (Secure Digital), a magnetic storage medium such as FD (Flexible Disk), or an optical storage medium such as CD-ROM (Compact Disc Read-Only Memory).

Note that the storage device 2 in Embodiment 1 and the storage device 5 in Embodiment 2 may be a storage medium of a computer connected to the computer shown in FIG. 10 via a network or the like, or a storage device that exists on a network.

Although the invention was described above with reference to embodiments, the invention is not limited to the above embodiments. Those skilled in the art will appreciated that various modifications can be made to the configurations and details of the invention without departing from the scope of the invention.

This application is based upon and claims the benefit of priority of prior Japanese Patent Application No. 2009-186743, filed on Aug. 11, 2009, the entire contents of which are incorporated herein by reference.

An information classification device, an information classification method and a computer readable recording medium in the invention have the following features.

(1) An information classification device for classifying contents targeted for classification into a category includes a first determination unit that performs correct/incorrect determination on the contents targeted for classification, using a first rule, and a second determination unit that applies each of a plurality of second rules having mutually different conditions to a content determined to be correct by the first determination unit and determines whether the condition is met, and performs correct/incorrect determination for a second time on the content determined to be correct by the first determination unit, based on a determination result of each of the plurality of second rules, the first rule being created using a result of correct/incorrect determination executed in advance on each of a plurality of contents that are different from the contents targeted for classification by two or more people and a feature amount of each of the plurality of different contents, and each of the plurality of second rules being created to correspond to a different one of the two or more people, using the result of correct/incorrect determination executed in advance by the two or more people and the feature amount.

(2) In the information classification device according to (1) above, the first rule is created to be a rule according to which a content that at least one person determines to be correct is taken as correct data and the other contents are taken as incorrect data, among the plurality of different contents.

(3) In the information classification device according to (1) above, each of the plurality of second rules is created to be a rule according to which a content that j people or less including a corresponding person agree on is taken as correct data and a content that k (k>j) people or more including the corresponding person agree on is taken as incorrect data, among the plurality of different contents.

(4) In the information classification device according to (1) above, the first rule is created by learning the correct/incorrect determination of the two or more people, using the result of correct/incorrect determination and the feature amount, and each of the plurality of second rules is created by learning the correct/incorrect determination of each person, using the result of correct/incorrect determination and the feature amount.

(5) In the information classification device according to (4) above, the first rule is learned by setting a content that at least one person determines to be correct as correct data and setting the other contents as incorrect data, among the plurality of different contents.

(6) In the information classification device according to (4) above, each of the plurality of second rules is learned by setting a content that j people or less including a corresponding person agree on as correct data and setting a content that k (k>j) people or more including the corresponding person agree on as incorrect data, among the plurality of different contents.

(7) In the information classification device according to (1) above, the second determination unit performs correct/incorrect determination for the second time, based on the number of second rules whose condition is met or the number of second rules whose condition is not met.

(8) The information classification device according to (4) above further includes a training data storage unit that stores, as training data, the result of correct/incorrect determination executed in advance by the two or more people and the feature amount, and a rule learning unit that creates the first rule and the second rules, by learning using the training data.

(9) An information classification method for classifying contents targeted for classification into a category includes the steps of (a) performing correct/incorrect determination on the contents targeted for classification, using a first rule, and (b) applying each of a plurality of second rules having mutually different conditions to a content determined to be correct in the step (a) and determining whether the condition is met, and performing correct/incorrect determination for a second time on the content determined to be correct in the step (a), based on a determination result of each of the plurality of second rules, the first rule being created using a result of correct/incorrect determination executed in advance on each of a plurality of contents that are different from the contents targeted for classification by two or more people and a feature amount of each of the plurality of different contents, and each of the plurality of second rules being created to correspond to a different one of the two or more people, using the result of correct/incorrect determination executed in advance by the two or more people and the feature amount.

(10) In the information classification method according to (9) above, the first rule is created to be a rule according to which a content that at least one person determines to be correct is taken as correct data and the other contents are taken as incorrect data, among the plurality of different contents.

(11) In the information classification method according to (9) above, each of the plurality of second rules is created to be a rule according to which a content that j people or less including a corresponding person agree on is taken as correct data and a content that k ($k>j$) people or more including the corresponding person agree on is taken as incorrect data, among the plurality of different contents.

(12) In the information classification method according to (9) above, the first rule is created by learning the correct/incorrect determination of the two or more people, using the result of correct/incorrect determination and the feature amount, and each of the plurality of second rules is created by learning the correct/incorrect determination of each person, using the result of correct/incorrect determination and the feature amount.

(13) In the information classification method according to (12) above, the first rule is learned by setting a content that at least one person determines to be correct as correct data and setting the other contents as incorrect data, among the plurality of different contents.

(14) In the information classification method according to (12) above, each of the plurality of second rules is learned by setting a content that j people or less including a corresponding person agree on as correct data and setting a content that k ($k>j$) people or more including the corresponding person agree on as incorrect data, among the plurality of different contents.

(15) In the information classification method according to (9) above, the step (b) comprises performing correct/incorrect determination for the second time, based on the number of second rules whose condition is met or the number of second rules whose condition is not met.

(16) The information classification method according to (12) above further including the step of (c) creating the first rule and the second rules, by executing learning using the result of correct/incorrect determination executed in advance by the two or more people and the feature amount, which are stored in advance as training data, prior to execution of the steps (a) and (b).

(17) A computer readable recording medium having recorded thereon a program for causing a computer to execute classification of contents targeted for classification into a category, the program including a command for causing the computer to execute the steps of (a) performing correct/incorrect determination on the contents targeted for classification, using a first rule, and (b) applying each of a plurality of second rules having mutually different conditions to a content determined to be correct in the step (a) and determining whether the condition is met, and performing correct/incorrect determination for a second time on the content determined to be correct in the step (a), based on a determination result of each of the plurality of second rules, the first rule being created using a result of correct/incorrect determination executed in advance on each of a plurality of contents that are different from the contents targeted for classification by two or more people and a feature amount of each of the plurality of different contents, and each of the plurality of second rules being created to correspond to a different one of the two or more people, using the result of correct/incorrect determination executed in advance by the two or more people and the feature amount.

(18) In the computer readable recording medium according to (17) above, the first rule is created to be a rule according to which a content that at least one person determines to be correct is taken as correct data and the other contents are taken as incorrect data, among the plurality of different contents.

(19) In the computer readable recording medium according to (17) above, each of the plurality of second rules is created to be a rule according to which a content that j people or less including a corresponding person agree on is taken as correct data and a content that k ($k>j$) people or more including the corresponding person agree on is taken as incorrect data, among the plurality of different contents.

(20) In the computer readable recording medium according to (17) above, the first rule is created by learning the correct/incorrect determination of the two or more people, using the result of correct/incorrect determination and the feature amount, and each of the plurality of second rules is created by learning the correct/incorrect determination of each person, using the result of correct/incorrect determination and the feature amount.

(21) In the computer readable recording medium according to (20) above, the first rule is learned by setting a content that at least one person determines to be correct as correct data and setting the other contents as incorrect data, among the plurality of different contents.

(22) In the computer readable recording medium according to (20) above, each of the plurality of second rules is learned by setting a content that j people or less including a corresponding person agree on as correct data and setting a content that k ($k>j$) people or more including the corresponding person agree on as incorrect data, among the plurality of different contents.

(23) In the computer readable recording medium according to (17) above, the step (b) comprises performing correct/incorrect determination for the second time, based on the number of second rules whose condition is met or the number of second rules whose condition is not met.

(24) In the computer readable recording medium according to (20) above, the program further includes a command for causing the computer to execute the step of (c) creating the first rule and the second rules, by executing learning using the result of correct/incorrect determination executed in advance by the two or more people and the feature amount, which are stored in advance as training data, prior to execution of the steps (a) and (b).

INDUSTRIAL APPLICABILITY

As described above, the present invention enables improvement in the classification precision of information classification to be achieved. Therefore, the present invention is useful in applications such as an information extraction device for extracting specific information from text and a data collection unit of a specialized retrieval device that executes searches by focusing only on specific information.

DESCRIPTION OF THE REFERENCE NUMERALS

1 Information classification device (Embodiment 1)
2 Storage device (Embodiment 1)
3 Information processing system (Embodiment 1)
4 Information classification device (Embodiment 2)
5 Storage device (Embodiment 2)
6 Information processing system (Embodiment 2)
10 Union of sets determination unit (Embodiment 1)
11 Individual determination unit (Embodiment 2)
12 Rule learning unit
13 Union of sets determination rule learning unit
14 Individual determination rule learning unit
20 Classification target data storage unit
21 Union of sets determination rule storage unit
22 Individual determination rule storage unit
23 Classification result storage unit
24 Training data storage unit
300 Processor
301 Program memory
302 Storage medium
303 Interface
304 Video card
305 Input device
306 Display device
307 Computer readable recording medium

The invention claimed is:

1. An information classification device for classifying contents targeted for classification into a category, comprising:
at least one processor which implements:
a first determination unit that performs correct/incorrect determination on the contents targeted for classification, using a plurality of first rules, each of which includes a rule condition specifying a condition of a rule and a corresponding score specifying a value in a case where the rule condition matches the contents targeted for classification, wherein the performing the correct/incorrect determination includes applying each of the plurality of first rules to the contents targeted for classification, calculating a total score of each of the contents targeted for classification based on the corresponding scores of the rule conditions matching each of the contents targeted for classification, determining a content among the contents targeted for classification to be correct, in response to the calculated total score of the content being greater than a predetermined threshold, and determining a content among the contents targeted for classification to be incorrect, in response to the calculated total score of the content being less than the predetermined threshold; and
a second determination unit that applies each of a plurality of second rules having mutually different conditions and including a judge ID specifying a corresponding judge, to the content determined to be correct by the first determination unit and determines whether the condition is met, and compares a number of second rules that agree with the determination result of the first determination unit to a number of second rules that do not agree with the determination result of the first determination unit, wherein
when there are more rules that agree with the determination result of the first determination unit than rules that do not agree with the determination result of the first determination unit, correct/incorrect determination is performed by the second determination unit in the same way as the first determination unit, and
when there are more rules that do not agree with the determination result of the first determination unit than rules that agree with the determination result of the first determination unit, correct/incorrect determination is not performed in the same way as the first determination unit,
wherein each of the plurality of first rules is created using a result of correct/incorrect determination executed in advance on each of a plurality of contents that are different from the contents targeted for classification by two or more people and a feature amount of each of the plurality of different contents, and
each of the plurality of second rules is created to correspond to a different one of the two or more people, using the result of correct/incorrect determination executed in advance by the two or more people and the feature amount.

2. The information classification device according to claim 1,
wherein each of the plurality of first rules is created to be a rule according to which a content that at least one person determines to be correct is taken as correct data and the other contents are taken as incorrect data, among the plurality of different contents.

3. The information classification device according to claim 1,
wherein each of the plurality of second rules is created to be a rule according to which a content that j people or less including a corresponding person agree on is taken as correct data and a content that k people or more including the corresponding person agree on is taken as incorrect data when k is greater than j, among the plurality of different contents, wherein j and k are integers having a value greater than or equal to one.

4. The information classification device according to claim 1,
wherein each of the plurality of first rules is created by learning the correct/incorrect determination of the two or more people, using the result of correct/incorrect determination and the feature amount, and
each of the plurality of second rules is created by learning the correct/incorrect determination of each person, using the result of correct/incorrect determination and the feature amount.

5. The information classification device according to claim 4,
wherein each of the plurality of first rules is learned by setting a content that at least one person determines to be correct as correct data and setting the other contents as incorrect data, among the plurality of different contents.

6. The information classification device according to claim 4,
wherein each of the plurality of second rules is learned by setting a content that j people or less including a corresponding person agree on as correct data and setting a content that k people or more including the corresponding person agree on as incorrect data when k is greater than j, among the plurality of different contents, wherein j and k are integers having a value greater than or equal to one.

7. The information classification device according to claim 1,
wherein the second determination unit performs correct/incorrect determination for the second time, based on the number of second rules whose condition is met or the number of second rules whose condition is not met.

8. The information classification device according to claim 4, further comprising:
a training data storage unit that stores, as training data, the result of correct/incorrect determination executed in advance by the two or more people and the feature amount; and
a rule learning unit that creates the plurality of first rules and the plurality of second rules, by learning using the training data.

9. An information classification method for classifying contents targeted for classification into a category, comprising the steps of:
(a) performing, using at least one processor, correct/incorrect determination on the contents targeted for classification, using a plurality of first rules, each of which includes a rule condition specifying a condition of a rule and a corresponding score specifying a value in a case where the rule condition matches the contents targeted for classification, wherein the performing the correct/incorrect determination includes applying each of the plurality of first rules to the contents targeted for classification, calculating a total score of each of the contents targeted for classification based on the corresponding scores of the rule conditions matching each of the contents targeted for classification, determining a content among the contents targeted for classification to be correct, in response to the calculated total score of the content being greater than a predetermined threshold, and determining a content among the contents targeted for classification to be incorrect, in response to the calculated total score of the content being less than the predetermined threshold; and
(b) applying, using the at least one processor, each of a plurality of second rules having mutually different conditions and including a judge ID specifying a corresponding judge, to the content determined to be correct in the step (a), and determining, using the at least one processor, whether the condition is met, and
comparing, using at least one processor, a number of second rules that agree with the determination result of the first determination unit to a number of second rules that do not agree with the determination result of the first determination unit, wherein
when there are more rules that agree with the determination result of the first determination unit than rules that do not agree with the determination result of the first determination unit, correct/incorrect determination is performed by the second determination unit in the same way as the first determination unit, and
when there are more rules that do not agree with the determination result of the first determination unit than rules that agree with the determination result of the first determination unit, correct/incorrect determination is not performed in the same way as the first determination unit,
wherein each of the plurality of first rules is created using a result of correct/incorrect determination executed in advance on each of a plurality of contents that are different from the contents targeted for classification by two or more people and a feature amount of each of the plurality of different contents, and
each of the plurality of second rules is created to correspond to a different one of the two or more people, using the result of correct/incorrect determination executed in advance by the two or more people and the feature amount.

10. The information classification method according to claim 9,
wherein each of the plurality of first rules is created to be a rule according to which a content that at least one person determines to be correct is taken as correct data and the other contents are taken as incorrect data, among the plurality of different contents.

11. The information classification method according to claim 9,
wherein each of the plurality of second rules is created to be a rule according to which a content that j people or less including a corresponding person agree on is taken as correct data and a content that k people or more including the corresponding person agree on is taken as incorrect data when k is greater than j, among the plurality of different contents, wherein j and k are integers having a value greater than or equal to one.

12. The information classification method according to claim 9,
wherein each of the plurality of first rules is created by learning the correct/incorrect determination of the two or more people, using the result of correct/incorrect determination and the feature amount, and
each of the plurality of second rules is created by learning the correct/incorrect determination of each person, using the result of correct/incorrect determination and the feature amount.

13. The information classification method according to claim 12,
wherein each of the plurality of first rules is learned by setting a content that at least one person determines to be correct as correct data and setting the other contents as incorrect data, among the plurality of different contents.

14. The information classification method according to claim 12,
wherein each of the plurality of second rules is learned by setting a content that j people or less including a corresponding person agree on as correct data and setting a content that k people or more including the corresponding person agree on as incorrect data when k is greater than j, among the plurality of different contents, wherein j and k are integers having a value greater than or equal to one.

15. The information classification method according to claim 9, wherein the step (b) comprises performing correct/incorrect determination for the second time, based on the number of second rules whose condition is met or the number of second rules whose condition is not met.

16. The information classification method according to claim 12, further comprising the step of:

(c) creating the plurality of first rules and the plurality of second rules, by executing learning using the result of correct/incorrect determination executed in advance by the two or more people and the feature amount, which are stored in advance as training data, prior to execution of the steps (a) and (b).

17. A non-transitory computer readable recording medium having recorded thereon a program for causing a computer to execute classification of contents targeted for classification into a category, the program including a command for causing the computer to execute the steps of:

(a) performing correct/incorrect determination on the contents targeted for classification, using a plurality of first rules, each of which includes a rule condition specifying a condition of a rule and a corresponding score specifying a value in a case where the rule condition matches the contents targeted for classification, wherein the performing the correct/incorrect determination includes applying each of the plurality of first rules to the contents targeted for classification, calculating a total score of each of the contents targeted for classification based on the corresponding scores of the rule conditions matching each of the contents targeted for classification, determining a content among the contents targeted for classification to be correct, in response to the calculated total score of the content being greater than a predetermined threshold, and determining a content among the contents targeted for classification to be incorrect, in response to the calculated total score of the content being less than the predetermined threshold; and (b) applying each of a plurality of second rules having mutually different conditions and including a judge ID specifying a corresponding judge, to the content determined to be correct in the step (a) and determining whether the condition is met, and comparing a number of second rules that agree with the determination result of the first determination unit to a number of second rules that do not agree with the determination result of the first determination unit, wherein when there are more rules that agree with the determination result of the first determination unit than rules that do not agree with the determination result of the first determination unit, correct/incorrect determination is performed by the second determination unit in the same way as the first determination unit, and when there are more rules that do not agree with the determination result of the first determination unit than rules that agree with the determination result of the first determination unit, correct/incorrect determination is not performed in the same way as the first determination unit, wherein each of the plurality of first rules is created using a result of correct/incorrect determination executed in advance on each of a plurality of contents that are different from the contents targeted for classification by two or more people and a feature amount of each of the plurality of different contents, and each of the plurality of second rules is created to correspond to a different one of the two or more people, using the result of correct/incorrect determination executed in advance by the two or more people and the feature amount.

18. The non-transitory computer readable recording medium according to claim 17, wherein each of the plurality of first rules is created to be a rule according to which a content that at least one person determines to be correct is taken as correct data and the other contents are taken as incorrect data, among the plurality of different contents.

19. The non-transitory computer readable recording medium according to claim 17, wherein each of the plurality of second rules is created to be a rule according to which a content that j people or less including a corresponding person agree on is taken as correct data and a content that k people or more including the corresponding person agree on is taken as incorrect data when k is greater than j, among the plurality of different contents, wherein j and k are integers having a value greater than or equal to one.

20. The non-transitory computer readable recording medium according to claim 17, wherein each of the plurality of first rules is created by learning the correct/incorrect determination of the two or more people, using the result of correct/incorrect determination and the feature amount, and each of the plurality of second rules is created by learning the correct/incorrect determination of each person, using the result of correct/incorrect determination and the feature amount.

21. The non-transitory computer readable recording medium according to claim 20, wherein each of the plurality of first rules is learned by setting a content that at least one person determines to be correct as correct data and setting the other contents as incorrect data, among the plurality of different contents.

22. The non-transitory computer readable recording medium according to claim 20, wherein each of the plurality of second rules is learned by setting a content that j people or less including a corresponding person agree on as correct data and setting a content that k people or more including the corresponding person agree on as incorrect data when k is greater than j, among the plurality of different contents, wherein j and k are integers having a value greater than or equal to one.

23. The non-transitory computer readable recording medium according to claim 17, wherein the step (b) comprises performing correct/incorrect determination for the second time, based on the number of second rules whose condition is met or the number of second rules whose condition is not met.

24. The non-transitory computer readable recording medium according to claim 20, wherein the program further includes a command for causing the computer to execute the step of:

(c) creating the plurality of first rules and the plurality of second rules, by executing learning using the result of correct/incorrect determination executed in advance by the two or more people and the feature amount, which are stored in advance as training data, prior to execution of the steps (a) and (b).

* * * * *